United States Patent [19]

Lentini et al.

[11] Patent Number: 4,841,161
[45] Date of Patent: Jun. 20, 1989

[54] MONITORING CIRCUIT FOR CONTROL MEANS AND SELECTIVE BREAKAWAY MEANS IN MODULAR SUPPLY SYSTEMS

[75] Inventors: Salvatore Lentini; Giuseppe Patti, both of Palermo, Italy

[73] Assignee: Italtel Societa Italiana Telecomunicazioni s.p.a, Milan, Italy

[21] Appl. No.: 10,281

[22] PCT Filed: Jul. 15, 1986

[86] PCT No.: PCT/EP86/00415

§ 371 Date: Feb. 2, 1987

§ 102(e) Date: Feb. 2, 1987

[87] PCT Pub. No.: WO87/00655

PCT Pub. Date: Jan. 29, 1987

[30] Foreign Application Priority Data

Jul. 16, 1985 [IT] Italy .................... 21584 A/85

[51] Int. Cl.⁴ .................................... H02J 1/00
[52] U.S. Cl. ........................... 307/85; 307/43
[58] Field of Search ............... 307/85, 86, 87, 80, 307/43, 44, 46, 49, 52, 53, 64; 361/79, 52, 88, 90, 93, 102; 323/234, 282

[56] References Cited

U.S. PATENT DOCUMENTS

| | | |
|---|---|---|
| 3,321,693 | 5/1967 | Heinrich et al. . |
| 3,381,205 | 4/1968 | Howell et al. . |
| 3,710,133 | 1/1973 | Ferraro . |
| 3,796,919 | 3/1974 | Johnson .................... 361/79 |
| 3,956,638 | 5/1976 | Ahrens et al. ............. 307/44 X |
| 4,174,534 | 11/1979 | Kotlarewsky . |
| 4,318,007 | 3/1982 | Rizzi ........................ 307/44 |
| 4,405,976 | 9/1983 | Mitchell et al. . |
| 4,476,399 | 10/1984 | Yoshida et al. ............. 307/80 X |
| 4,516,035 | 5/1985 | Rhoads et al. . |
| 4,677,309 | 6/1987 | Ogawa .................... 307/87 X |
| 4,694,193 | 9/1987 | Schlenk et al. ............ 307/87 X |
| 4,707,142 | 11/1987 | Baker et al. . |

FOREIGN PATENT DOCUMENTS 59-201681 11/1984 Japan .

*Primary Examiner*—William M. Shoop, Jr.
*Assistant Examiner*—Sharon D. Logan
*Attorney, Agent, or Firm*—Birch, Stewart, Kolasch & Birch

[57] ABSTRACT

Modular supply systems usually include a plurality of n elementary power units, connected in parallel to each other. Control unit (RV) and selective breakaway unit (DS) are associated with each elementary power unit. The monitoring circuit (CP) includes a first device (PM) which calculates the entity of the deviation (E) between a signal ($I_{ui}$) that is proportional to the current supplied by the relevant power unit ($UA_i$) and a signal ($I_{med}$) that is proportional to the average value of the currents supplied by the n power units. Also, a second device (SM) algebraically sums the deviation (E) to a signal ($V_{ui}$) that is proportional to the voltage available on the output of the relevant power unit. The signal (Vc) that is available on the output of the second device is delivered to the control unit (RV) and the selective breakaway unit (DS).

3 Claims, 2 Drawing Sheets

MONITORING CIRCUIT FOR CONTROL MEANS AND SELECTIVE BREAKAWAY MEANS IN MODULAR SUPPLY SYSTEMS

BACKGROUND OF THE INVENTION

The present invention relates to a monitoring circuit for control means and selective breakaway means in modular power supply systems, particularly for telecommunications equipment. More particularly, the present application relates to a circuit designed to enable the right distribution of the load among the elements which compose the system as well as the location and the selective switching off of the units that are out of order. The supply systems of the type described above are usually comprised of a plurality of basic unit (such as rectifiers, or inverters, etc.) that are connected to each other in parallel. This type of connection is used, for example, when the power to be supplied by the system is not delivered by a single power unit and the power is therefore supplied by several power units that are connected in parallel to each other. In addition to the power units that are necessary to supply the operating power, usually at least one other power unit is added, in order to act as a hot reserve to be used in case of a failure of one or more of the operating power units.

In these types of systems, optimum conditions are obtained when the total current absorbed by the load is equally supplied by the n elementary units, that is when each power unit supplies a current I having a value of It/n.

Furthermore, it must be noticed that when the power units are comprised of inverters, besides the optimization problems as described above, further new technical problems occur in connection with the phase relationship of the oscillations that are supplied by each inverter. In fact, an inverter is constituted by a unit that is designed to receive a continuous voltage on its input and the inverter is adapted to deliver a sinusoidal voltage to the output so that the frequency of the inverter normally coincides with the frequency of the electrical power distribution line.

The inverters of the previous generation are characterized by the fact that they present an output impedance that does a not have an excessively low value. Consequently, the problems relating to an equal power distribution as described above can be solved through slow control adjustment systems.

On the other hand, modern generation inverters are configured to approximate an ideal voltage generator and are consequently characterized in that they have a particularly low output impedance. The low impedance values result from the use of means that are designed to act in such a manner that the oscillations generated by the inverters have the same level and phase at any time. In fact, if the power system is constituted by n elementary units, having one unit which supplies an oscillation that is shifted in phase with respect to the oscillations generated by the further n−1 units, the power delivered by the n−1 units is delivered to the unit that is out of phase. Consequently possible damage to the unit may be caused the power supplied to the load may be reduced. CL SUMMARY OF THE INVENTION Therefore, the basic technical problem of the present invention is how to realize a supply system with a monitoring circuit that is particularly fast for allowing level and phase variations in the oscillations, generated by each inverter, in a time as short as possible. A short time will minimize the duration of the negative effects caused by a possible phase shift as described above and will consequently avoid the danger of any damage. The Purpose of the embodiments in the present application is to solve the aforementioned technical problem through the use of circuitry that is particularly simple and economical.

For this purpose and according to the present embodiments of the supply system is of the type comprising n elementary power units, that are connected in parallel to each other with each having control and selective breakaway means.

The monitoring circuit includes the presence of the following characteristic elements:

First means, designed to receive a first signal on their input, that is proportional to the current supplied by the relevant power unit. Also a second signal that is proportional to the average current value is supplied by the n power units and is adapted to calculate the entity of an error signal corresponding to the difference between the first signal and the second signal;

Second means, designed to algebraically add the error signal at the output of the first means to a third signal. The value of the third signal is proportional to the voltage that is supplied by the relevant power unit. Furthermore, the second means is designed to send the third signal, obtained as described above, to the control and selective breakaway means.

The control means modifies the level of the signal relevant power unit until the error signal is cancelled. On the other hand, the selective breakaway means switched off the relevant power unit from the parallel connection when the signal that is supplied by the second means deviates from a nominal value by a predetermined entity.

BRIEF DESCRIPTION OF THE DRAWING

Further characteristics of the application will be more evident in the following description only one embodiment of the invention is given as an example and is complemented by the attached drawings in which.

DETAILED DESCRIPTION OF THE PREFERRED EMBODIMENTS

Figure 1:
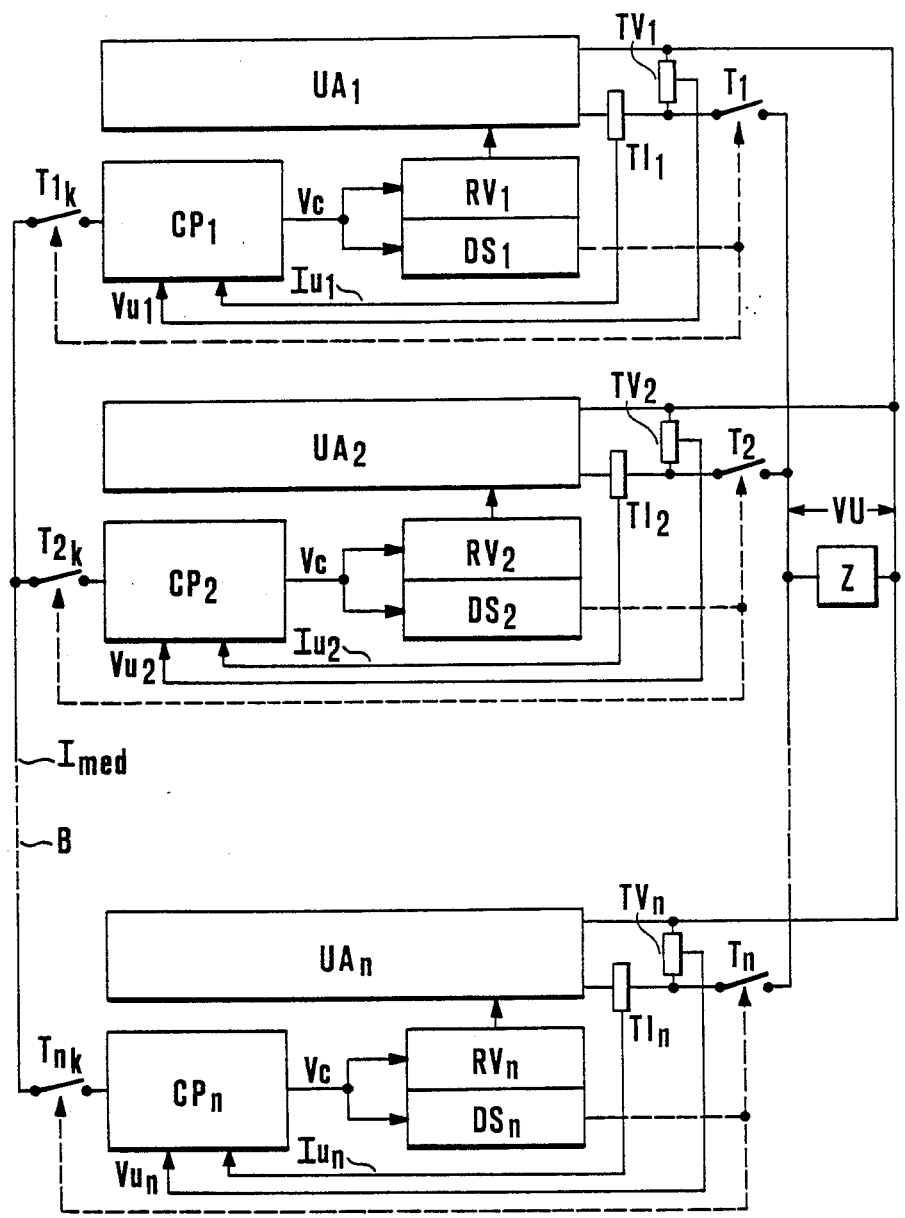
FIG. 1 shows a block diagram of a supply system that is referred to in one embodiment of the present application.

In FIG. 1, $UA_1$, $UA_2$, ..., $UA_n$ refer to a plurality of power units that are connected in parallel to each other by means of the switches $T_1$, $T_2$, ..., $T_n$. A monitoring circuit CP, voltage control means RV and selective breakaway means DS are associated to each power unit UA.

Each monitoring circuit CP is connected by means of a contact K of the relevant switch T to a common bus B. There is a signal $I_{med}$ on the common bus B that is proportional to the average value of the current supplied by each power unit UA.

Furthermore, the circuits CP receive a signal $Iu_i$ on their inputs that is proportional to the current value supplied by the relevant power unit $UA_i$ that is and a signal $Vu_i$ proportional to the voltage supplied by the relevant power unit $UA_i$. Each signal $IU_i$ is respectively detected by means of a voltage transducer $TV_i$.

The task of each monitoring circuit is to generate a signal VC in response to the presence of a voltage error on the relevant power unit UA of the same value.

In fact, the signal Vc of reaches the input of the respective voltage control means RV which modifies the level of the signal generated by the relevant power unit UA. The signal Vc is modified until a nominal value is reached and consequently the signal generated by the relevant power unit has a value that is within the predetermined tolerance limits.

Also, the signal Vc reaches the input of the respective selective breakaway means DS which activates on output when the difference between the signal Vc and nominal value of the respective selective breakaway means evidences the presence of a failure in the relevant power unit UA. Considering that a generical power unit can be considered to be out of order when the output voltage differs by more than 5% from a nominal value, the means DS has the task of detecting the presence of this condition and activating an output in order to determine the opening of the relevant switch $T_i$. Thus, is switched off the unit UA that has failed.

Figure 2:
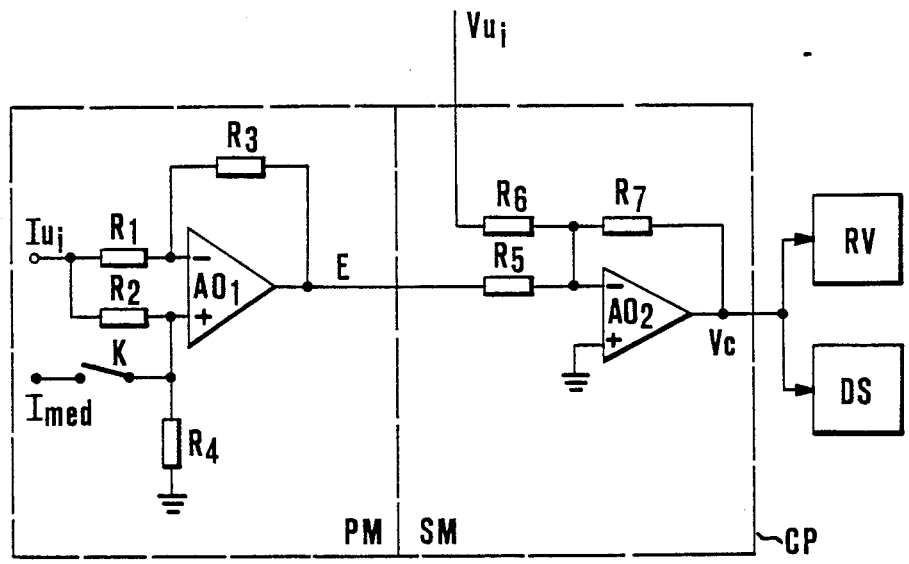
FIG. 2 shows in detail one of the monitoring circuits CP from FIG. 1.

FIG. 2 illustrates a generical monitoring circuit CP which comprises by first means PM adapted to calculate the entity of the error signal E on the relevant power unit UA. Furthermore, second means SM algebraically sums the error signal E to a signal that is proportional to the voltage supplied by the relevant power unit UA.

The first means PM comprises by an operational amplifier $AO_1$, to the inputs of which the signal $Iu_i$ (which is proportional to the current supplied by the relevant power unit) is applied by means of first and a second resistors $R_1$ and $R_2$ of equal value. Between the output of the amplifier $AO_1$ and the inverting input, a first feedback resistor $R_3$ is connected. While between the non-inverting input and ground, a second feedback resistor $R_4$ is connected having a value equal to that of the resistor $R_3$. When a generical power unit $UA_i$ is inserted into the parallel connection, the switch $T_i$ and the relevant contact $K_i$ are closed. As a consequence, the signal $I_{med}$, which is proportional to the average value of the current supplied by the power units, reaches the non-inverting input of the unit $AO_1$.

If the resistors described above are so dimensioned as to satisfy the relationship $R_1=R_2$ and $R_3=R_4$, an error signal E, expressing the voltage error on the relevant power unit corresponds to the output of the unit $AO_1$. In particular, the error signal E represents a signal that is proportional to the entity of a shifting between the voltage supplied by the power unit actually under examination and the average value of the voltage supplied by the remaining $(n-1)$ units.

On the other hand, the means SM comprises by a second operational amplifier $AO_2$ which has the non-inverting input connected to a reference potential and the inverting input connected to the output of the unit $AO_1$ by means of a resistor $R_5$. The inverting input also receives the signal $Vu_i$ by means of a resistor $R_6$ and a feedback signal by means of a resistor $R_7$. Under normal operating conditions the output voltages of the various power units are perfectly pulled in phase. The output voltage VU that is applied to the load Z is equal to the average value among the voltages at the outputs of the varius power units. Each power unit compares its own current output with the average current and adjusts its own output voltage until a current equal to the average value is supplied.

In the event that one of the power units delivers a higher current than the average current, the error signal $E_i$ will appear to be in phase to the output voltage $Vu_i$. Consequently, the regulation means $RV_i$ receives a signal $VC_i$ on the input with a higher value than the nominal one. As a consequence, the means $RV_i$ arranges a reduction in the current supplied by the relevant power unit $UA_i$ until the current value is approximately equal to the average current. On the contrary, if one of the power units supplies a lower current than the average current the error signal $E_i$ will appear to be in phase opposition to the signal $Vu_i$ and consequently the regulation means $RV_i$ receives a signal $Vc_i$ on the input having a lower value than the nominal signal. As a consequence, the means $RV_i$ determines an increase in the current supplied by the relevant power unit $UA_i$ until the current value is approximated equal to the average current.

Besides allowing the adjustment of the current that is supplied by the relevant power unit, the signal Vc also enables indications about the relevant power unit operation.

In fact, the weight of the signal $E_i$ has been determined in such a way that the power units which operate at nominal voltage, receive a signal Vc having a nominal value on the inputs. In particular, the weight of the error signal $E_i$ has been determined so that the error that is picked up on the signal $Vu_i$, due to the failure of a power unit, is the same vaue but opposte to the contribution brought by the signal $E_i$. Consequently the signal Vc, which refers to the units operating at nominal voltage, presents a nominal value.

In contrast the faulty unit the error present on the signal $Vu_i$ in consequence to the failure of the power unit, is added to the error $E_i$. Consequently, the selective breakaway means $DS_i$ of the faulty unit $UA_i$ receives a signal Vc on the input that differs from the nominal value for the same error percentage that is present on the output voltage.

Let us suppose that the power system is composed of two elementary power units, the first of which is operating at nominal voltage, while the second presents an overvoltage error equal, for example, to 5%. If the output voltage is supplied by inverters having a low output impedance, then the voltge VU that is applied to the load will be equal to $VU_n (1+2.5\%)$, where $VU_n$ represents the nominal output voltage.

On the basis of the material specified above, the voltage regulation means RV of the inverter that is not faulty, receives a signal Vc on the input having the same value as the nominal signal $Vc=Vu_n$, where $Vu_n$ represents a signal that is proportional to the nominal output voltage $VU_n$. In fact:

$$(Vu + 2.5\%\ VU_n) + (-2.5\%\ Vu_n) = Vu_n = Vc.$$

This is due to the fact that the signal $E_i$ appears to be in an opposite phase to the signal $Vu_i$ and the contribution brought by $E_i$ appears to be the same value but opposite to the variation present on the signal $VU_i$.

The voltage control circuit RV of the inverter affected by the failure receives a signal Vc on the input that differs from the nominal value $Vc_n$ for the same error percentage that is present on the relevant power unit. In fact:

$$(Vu_n + 2.5\%\ Vu_n) + (+2.5\%\ Vu_n) = Vu_n + 5\% Vu_n = Vc.$$

This is due to the fact that the signal $E_i$ is in phase with the signal $Vu_i$.

The selective breakaway means DS will not be described in detail herein as they are of a well known type that comprises threshold circuits designed to operate their outputs whenever signals are recieved on their input which differs from their own nominal value by a predetermined entity (for example 5%).

The activation of the output of the means $DS_i$ opens the switch $T_i$ which switches off the power unit $UA_i$ affected by the failure.

The voltage control means RV will be not described in detail as they are well known to a person skilled in the art.

The monitoring circuits CP as claimed in the embodiment satisfy the requisites cited in the invention because they deliver the signal Vc, which allows the selective breakaway operations, to be carried out even when the output voltage deviates from the nominal value by a limited entity (for example ±5%). This has the advantage that the oversizing in current of the supply system, due the to current distribution, can be contained within low values (5% of the nominal current). In the control systems, already known, an oversizing of current to the order of 10% is required consequently, when the power system has to supply a higher power (for example 100 KW), a 5% reduction of the oversizing power constitutes a value that is ignored.

Furthermore, the monitoring circuit according to the embodiment, is characterized by the fact that an adjustment of the output voltage is allowed in a very short time. Thus, the monitoring circuit is suitable for use in combination with all types of power units, such as rectifiers, positive/negative voltage boosters or inverters.

Although the present invention has been described in connection with the preferred embodiment thereof, many variations and modifications may be made without departing from the scope or spirit of the invention. It is preferred, therefore, the present invention is not limited by the disclosure herein, but by the claims.

What is claimed is:

1. A modular supply system for controlling power supplied to a load, comprising:
    a plurality of power units connected in parallel, each of said plurality of power units including,
        power supply means for supplying a voltage signal and a current signal to the load,
        first monitoring means for developing an error signal corresponding to the difference between said current signal and a source current signal,
        second monitoring means for developing a voltage error signal corresponding to the summation of said voltage and said error signal,
        control means for regulating said voltage and current signals supplied from said power supply means within a predetermined tolerance limit in response to said voltage error signal, and
        selective breakaway means for disconnecting said power supply means in response to said voltage error signal being detected outside of said predetermined tolerance limit;
    each of said plurality of power units that has said power supply means connected providing an equal distribution of power to the load.

2. A modular supply system as described in claim 1, wherein said first monitoring means comprises:
    a first operational amplifier having said current signal connected by a first and a second resistor of equal values, and said source current signal connected to the non-inverting input by a circuit breaker;
    a first feedback resistor connected between the output of the first operational amplifier and the inverting input of said first operational amplifer; and
    a second feedback resistor, having a value equal to said first feedback resistor, connected between the non-inverting input of the first operational amplifier and a reference potential.

3. A modular supply system as described in claim 1, wherein said second monitoring means comprises:
    a second operational amplifier, the non-inverting input of said second operational amplifier being connected to the reference potential and the inverting input of said second operational amplifier being connected to the output of the first operational amplifier ($AO_1$), by a third resistor and said voltage signal being conncted by a fourth resistor; and
    a third feedback resistor connected between the output of the second operational amplifier and the inverting input of said second operational amplifier.

* * * * *